Jan. 31, 1961   J. S. FALZONE   2,969,782
ANTI SMOG MEANS
Filed March 9, 1960
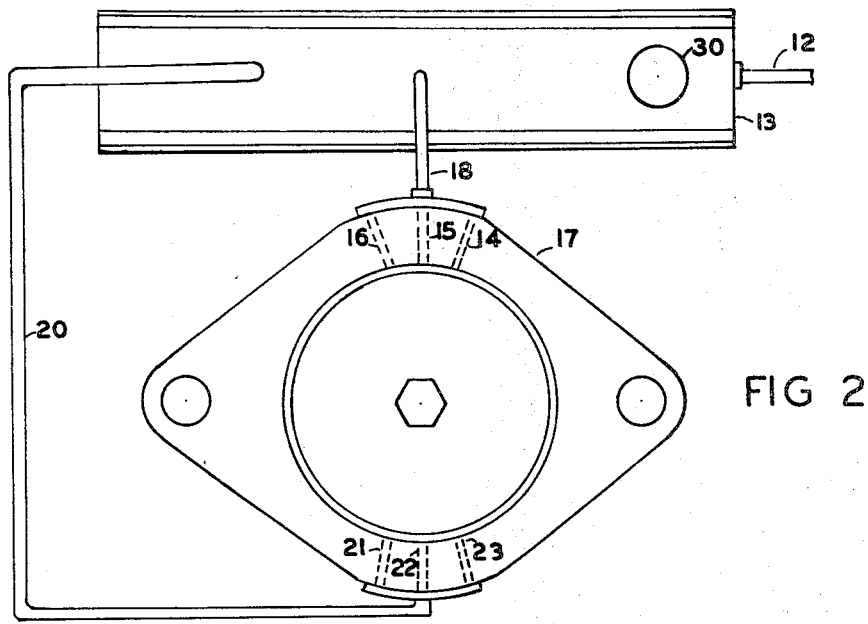
FIG 2
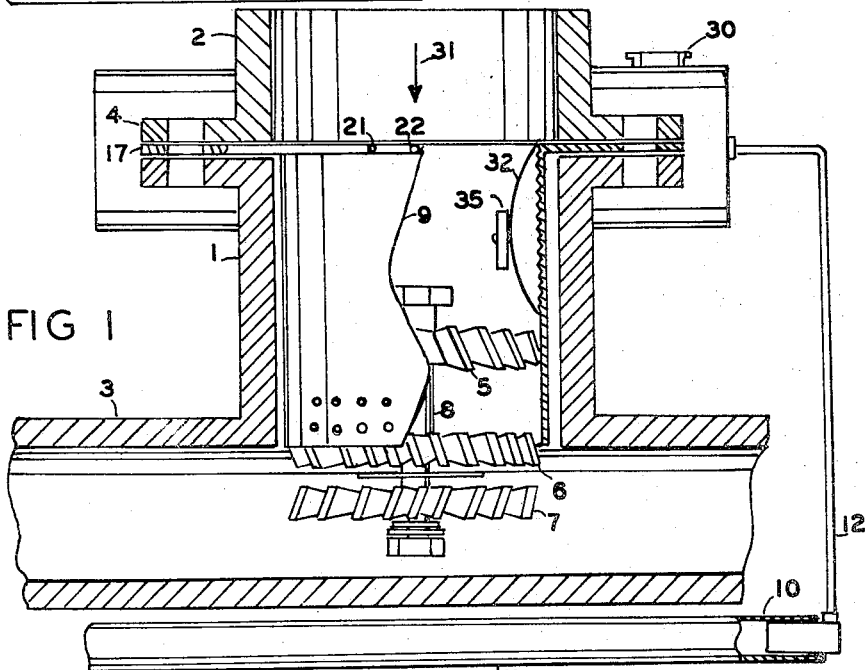
FIG 1
FIG 3   FIG 4
INVENTOR.
JOSEPH S. FALZONE

2,969,782

ANTI SMOG MEANS

Joseph S. Falzone, 62 Crescent Court, Old Bethpage, N.Y.

Filed Mar. 9, 1960, Ser. No. 13,882

2 Claims. (Cl. 123—119)

This invention relates to anti smog means for internal combustion engines and more particularly to means for reducing air pollution caused by automobiles and at the same time increasing the efficiency of automobile engines.

It is well known that the efficiency of internal combustion engines is quite low. One of the factors in this low efficiency is the lack of optimum mixing of the gasoline and air which results in incomplete combustion which represents a loss of potential energy and an increase in smoke and soot output from the exhaust.

The air pollution caused by automobiles in large cities contributes greatly to the industrial smog which is a serious problem and which is becoming more acute as time goes on.

The present invention provides a means for minimizing smog due to incomplete combustion of automobile engines by increasing the mixing efficiency, by filtering the exhaust and by recirculating a portion of the exhaust gases through a mixer and then back through the engine. Therefore the present invention not only minimizes smog and pollution but by the same process extracts extra energy out of the fuel so that the optimum condition is obtained whereby there is a maximum combustion and a minimum of waste products.

More specifically, the invention provides a mechanical mixing means consisting of moving blades, the mixing means being inserted between the carburetor and the intake manifold; a filter is provided in the exhaust pipe and a portion of the exhaust gases is taken from the filter and recirculated through the mixing device and the combustion chambers. The mixing means may be as shown in my prior Patent 2,789,041, entitled Fuel Mixing Means, granted April 16, 1957.

A pneumatic tank is provided in the recirculating path which may be used to add alcohol or other components to the fuel mixture, for instance to minimize special conditions such as icing of the fuel line.

Accordingly, a principal object of the invention is to provide new and improved fuel feeding means for internal combustion engines.

Another object of the invention is to provide means to minimize air pollution or smog caused by automobile engines.

Another object of the invention is to provide means to minimize air pollution or smog caused by automobile engines in combination with means to increase the efficiency of automobile engines.

Another object of the invention is to provide means to minimize air pollution or smog caused by automobile engines in combination with means to increase the efficiency of automobile engines, including means to filter the exhaust gases to feed back a portion of the exhaust gases through a mixing device located between the carburetor and the intake manifold.

Another object of the invention is to provide new and improved means to minimize the effects of icing of the fuel lines with resultant difficult starting.

These and other objects of the invention will be apparent from the following specification and drawings, of which:

Fig. 1 is a side sectional view of the mixing device of the present invention;

Fig. 2 is a top plane view of Fig. 1; and

Fig. 3 is an end view and Fig. 4 is a sectional view of the filter of Fig. 3.

Referring to the figures the invention comprises a mixing device 1 which is located between the output of the carburetor 2 and the intake manifold 3. The mixing device preferably has flanges 17 bolted to the flanges 4 of the carburetor and comprises a casing 9, a Venturi pipe 32 and one or more turbine blades 5, 6, 7. One or more magnets 35 may be mounted in the casing to trap metal particles. The turbine blades are mounted on a center shaft 8 which is anchored to the casing 9 which is preferably perforated. One set of the turbine blades 6 may be stationary and welded to the casing 9 for the purpose of supporting the shaft 8 for the rotating blades 5 and 7 which are drawn by the flow of the mixture. The mixing device is substantially as shown in my prior Patent 2,789,041 entitled Fuel Mixing Means, granted April 16, 1957.

The present invention incorporates a filter 10 which is inserted in the exhaust pipe 11 and which feeds back through the pipe 12 a portion of the exhaust gases. The pipe 12 is connected at its other end to a pneumatic tank 13 which is preferably mounted on the engine block with a suitable bracket. The output of the tank 13 is connected to small shaftways 14, 15, 16 in the flange 17 of the mixing device by the pipe 18. A corresponding connection is made through the pipe 20 to the shaftways 21, 22, 23 which are drilled through the other side of the flange 17.

Figures 3 and 4 show details of the filter 10. It comprises a cylindrical casing 24 which is adapted to be inserted in the exhaust pipe 11, for instance at the end thereof with a suitable holding screw or clamp. The internal construction of the filter comprises a honeycomb 32 of metal plates which may be formed for instance by rolling a perforated corrugated sheet. The upper portion of the filter is blocked off by means of a cover 26 to retain sufficient pressure for feeding back a portion of the exhaust gases through the feedback pipe 12 as previously described. A screen 33 is mounted on the output side of the filter. The filter is preferably mounted at the end of the exhaust pipe so that it can be easily slipped out of the exhaust pipe for cleaning. In order to clean the accumulated soot, sludge and other material from the filter it is preferably dipped into a container filled with kerosene or other solvent. The filter should be cleaned periodically, for instance, once a month depending upon the amount of use.

The tank 13 preferably has a removable cap type cover 30 so that alcohol, lubricating oil or other fuel additives may be inserted therein. When the tank 13 is partially filled with alcohol it will be vaporized and drawn into the mixing device and then into the intake manifold. This feature is desirable for starting, for instance when there may be some icing of the carburetor or gasoline lines.

In the normal operation of the device, a portion of the filtered exhaust gases will be fed back through the pipe 12 and the tank 13 to the mixing device 1 by means of the vacuum pressure. The exhaust gases will then be thoroughly mixed with the incoming air and gasoline mixture, the direction of which is indicated by the arrow 31.

The pneumatic tank acts as a reservoir for various fuel additives. The tank is vented through the exhaust pipe and filter when the engine is not running. When the engine is running there is a certain amount of pressure built up in the covered section of the filter which assists in recirculating a portion of the exhaust gases. The honey comb or mesh of the filter may be varied in particular applications. If the mesh is finer the filter must be cleaned more often. However, the finer the mesh the more sludge and foreign materials will be trapped.

Various locations for the filter may be used and the filter may be located at any place in the exhaust system. Also, different feedback connections may be made without departing from the scope of the invention which is defined by the following claims.

I claim:

1. Anti smog means for internal combustion engines of the type having a carburetor, an intake manifold and an exhaust pipe comprising a filter mounted in said exhaust pipe, a mixer connected between said carburetor and said intake manifold, and means connecting said filter to the input side of said mixer, including a tank connected to the input side of said mixer and a pipe connecting said filter to said tank, a portion of said filter being blocked off.

2. Anti smog means for internal combustion engines of the type having a carburetor, an intake manifold and an exhaust pipe comprising a mixer connected between said carburetor and said intake manifold, and means connecting said exhaust pipe to the input side of said mixer, including a tank connected to the input side of said mixer and a pipe connecting said exhaust pipe to said tank.

References Cited in the file of this patent

UNITED STATES PATENTS

| | | |
|---|---|---|
| 1,201,977 | Lovejoy | Oct. 17, 1916 |
| 1,309,114 | Black | July 8, 1919 |
| 1,440,956 | Ballenger | Jan. 2, 1923 |
| 1,566,332 | Lilly | Dec. 22, 1925 |
| 1,750,342 | Bailey | Mar. 11, 1930 |